(12) United States Patent
Merino Vazquez et al.

(10) Patent No.: US 9,019,954 B2
(45) Date of Patent: Apr. 28, 2015

(54) METHODS AND APPARATUSES FOR HANDLING PUBLIC IDENTITIES IN AN INTERNET PROTOCOL MULTIMEDIA SUBSYSTEM NETWORK

(75) Inventors: Emiliano Merino Vazquez, Leganes (ES); Luis Miguel Almaraz Valdes, Galapagar (ES); Julia Berlanga Izquierdo, Coslada (ES); Nuria Esteban Vares, Aranjuez (ES); Maria Ruth Guerra, Stockholm (SE); Beatriz Maroto Gil, Majadohonda Madrid (ES)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 865 days.

(21) Appl. No.: 12/973,374

(22) Filed: Dec. 20, 2010

(65) Prior Publication Data

US 2011/0310889 A1    Dec. 22, 2011

Related U.S. Application Data

(63) Continuation of application No. PCT/SE2010/051408, filed on Dec. 17, 2010.

(60) Provisional application No. 61/356,133, filed on Jun. 18, 2010.

(51) Int. Cl.
*H04L 12/56* (2006.01)
*H04L 29/06* (2006.01)

(52) U.S. Cl.
CPC ........ *H04L 65/1016* (2013.01); *H04L 65/1069* (2013.01)

(58) Field of Classification Search
USPC ......... 370/328, 329, 338, 352–357, 389–392; 709/225, 227; 455/435.1, 435.2
See application file for complete search history.

(56) References Cited

U.S. PATENT DOCUMENTS

2004/0187021 A1*   9/2004 Rasanen ................ 713/200
2005/0009520 A1*   1/2005 Herrero et al. ........ 455/435.1
(Continued)

FOREIGN PATENT DOCUMENTS

CN    101141483 A    3/2008
EP    2106091 A1    9/2009
(Continued)

OTHER PUBLICATIONS

International Search Report issued in corresponding International Search Report PCT/SE2010/051408, date of mailing Jun. 14, 2011.
(Continued)

*Primary Examiner* — Ian N Moore
*Assistant Examiner* — Jenee Williams
(74) *Attorney, Agent, or Firm* — Patent Portfolio Builders PLLC

(57) ABSTRACT

The present invention concern methods and apparatuses for handling public identities in an Internet Protocol Multimedia Subsystem, IMS, network. A CSCF node receives information indicating a set of distinct public identities, within a range of a wildcarded public identity, which set of distinct public identities are not in the same Implicit Registration Set (IRS) as the wildcarded public identity. The information is received from a Home Subscriber Server (HSS) node. The CSCF node stores the information indicating the set of distinct public identities, which are not in the same IRS, in the CSCF node for allowing matching of an originating request to the information indicating the set of distinct public identities, which are not in the same IRS. Alternatively, the CSCF node forwards the information indicating the set of distinct public identities, which are not in the same IRS, to another CSCF node, for allowing matching of an originating request to the information indicating the set of distinct public identities, which are not in the same IRS.

14 Claims, 8 Drawing Sheets

(56) References Cited

U.S. PATENT DOCUMENTS

| | | | |
|---|---|---|---|
| 2005/0071679 A1* | 3/2005 | Kiss et al. | 713/201 |
| 2005/0238002 A1* | 10/2005 | Rasanen | 370/352 |
| 2005/0278420 A1* | 12/2005 | Hartikainen et al. | 709/203 |
| 2007/0055874 A1* | 3/2007 | Phan-Anh et al. | 713/168 |
| 2007/0297419 A1* | 12/2007 | Askerup et al. | 370/395.52 |
| 2008/0003957 A1* | 1/2008 | Schwagmann et al. | 455/91 |
| 2008/0020789 A1* | 1/2008 | Yan et al. | 455/466 |
| 2008/0070543 A1* | 3/2008 | Matuszewski et al. | 455/404.1 |
| 2008/0089290 A1* | 4/2008 | Coulas et al. | 370/331 |
| 2008/0092224 A1* | 4/2008 | Coulas et al. | 726/12 |
| 2008/0104696 A1* | 5/2008 | Li et al. | 726/21 |
| 2008/0155658 A1* | 6/2008 | Leinonen et al. | 726/4 |
| 2008/0219241 A1* | 9/2008 | Leinonen et al. | 370/352 |
| 2008/0227451 A1* | 9/2008 | Fukui et al. | 455/435.1 |
| 2008/0261592 A1* | 10/2008 | Finizole E Silva et al. | 455/435.1 |
| 2008/0273704 A1* | 11/2008 | Norrman et al. | 380/278 |
| 2009/0210743 A1* | 8/2009 | Gu et al. | 714/15 |
| 2009/0215453 A1* | 8/2009 | Blanco Blanco et al. | 455/435.1 |
| 2009/0227236 A1* | 9/2009 | Sanchez Herrero et al. | 455/414.1 |
| 2009/0245240 A1* | 10/2009 | Mao et al. | 370/352 |
| 2009/0252157 A1* | 10/2009 | Van Elburg et al. | 370/352 |
| 2009/0253431 A1* | 10/2009 | Shi et al. | 455/435.1 |
| 2009/0279425 A1* | 11/2009 | Du et al. | 370/216 |
| 2010/0011004 A1* | 1/2010 | Rajko et al. | 707/10 |
| 2010/0229027 A1* | 9/2010 | Belinchon Vergara et al. | 714/4 |
| 2010/0232402 A1* | 9/2010 | Przybysz | 370/338 |
| 2010/0232422 A1* | 9/2010 | Blanco et al. | 370/352 |
| 2010/0246780 A1* | 9/2010 | Bakker et al. | 379/38 |
| 2010/0290456 A1* | 11/2010 | Mutikainen et al. | 370/352 |
| 2010/0299442 A1* | 11/2010 | van Elburg | 709/229 |
| 2010/0312832 A1* | 12/2010 | Allen et al. | 709/204 |
| 2010/0325275 A1* | 12/2010 | Van Elburg et al. | 709/225 |
| 2011/0119363 A1* | 5/2011 | Hua et al. | 709/223 |
| 2011/0310888 A1* | 12/2011 | Merino Vazquez et al. | 370/352 |
| 2011/0310889 A1* | 12/2011 | Merino Vazquez et al. | 370/352 |
| 2012/0011273 A1* | 1/2012 | Van Elburg et al. | 709/238 |
| 2012/0227084 A1* | 9/2012 | Shen | 726/2 |

FOREIGN PATENT DOCUMENTS

| | | | | |
|---|---|---|---|---|
| WO | WO 2008101547 A1 * | 8/2008 | | H04L 29/06 |
| WO | 2008/148421 A1 | 12/2008 | | |

OTHER PUBLICATIONS

"Digital Cellular Telecommunications System (Phase 2+); Universal Mobile Telecommunications System (UMTS); LTE; IP Multimedia Subsystem (IMS); Stage 2 (3GPP TS 23.228 version 8.12.0 Release 8)", Technical Specification, European Telecommunications Standards Institute (ETSI), vol. 3GPP SA 2, No. V8.12.0, Mar. 1, 2010, XP014046427, 650, Route des Lucioles, F-06921 Sophia-Antipolis, France.

International Preliminary Report on Patentability and Written Opinion of the International Searching Authority issued in corresponding to International application No. PCT/SE2010/051408, date of issuance Dec. 18, 2012.

First Office Action (with English translation) of related Chinese Patent Application No. 201080067516.8, issued Dec. 3, 2014.

* cited by examiner

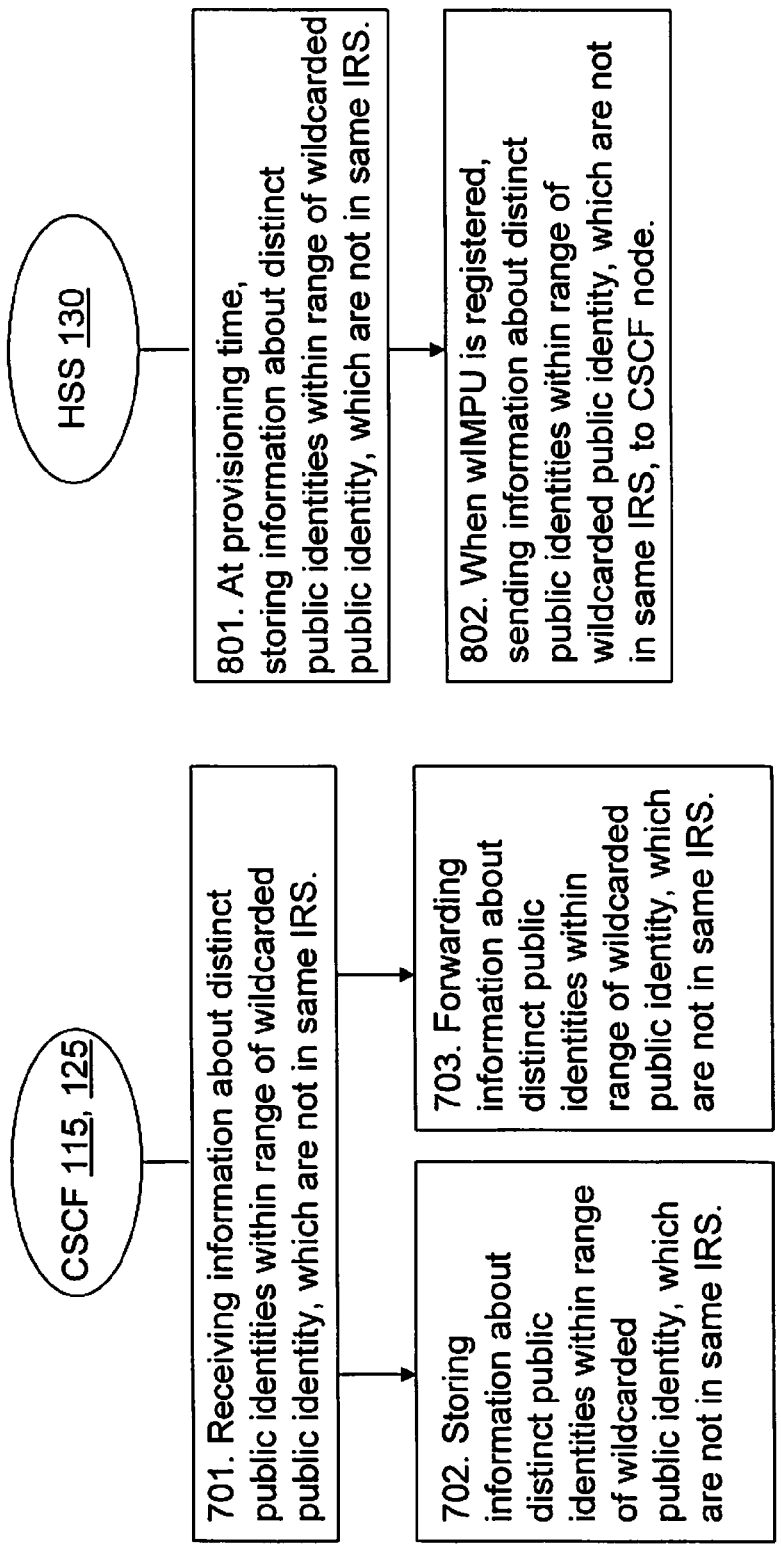

METHODS AND APPARATUSES FOR HANDLING PUBLIC IDENTITIES IN AN INTERNET PROTOCOL MULTIMEDIA SUBSYSTEM NETWORK

TECHNICAL FIELD

The present invention relates to methods and apparatuses for handling public identities in an Internet Protocol Multimedia Subsystem (IMS) network and in particular to methods and apparatuses for handling wildcarded public identities.

BACKGROUND

With the emergence of new technologies for mobile telephony, packet-based communication solutions using Internet Protocol (IP) have been developed to support the usage of multimedia services, while different mobile and fixed user terminals with new functionalities for multimedia communication are emerging on the market. Services are also constantly being developed for terminal users to increase the field of usage and enhance the experience when generally consuming communication services.

An IP Multimedia Subsystem (IMS) network can be used for enabling multimedia services and other communication services by initiating and controlling sessions for user terminals connected to various different access networks. The sessions are handled by specific session control nodes in the IMS network, including those referred to as Call Session Control Function (CSCF) nodes.

The signaling protocol Session Initiation Protocol (SIP) is used for multimedia sessions in IMS networks and other communication services networks.

Various identities may be associated with IMS, such as private user identities, IP Multimedia Private Identity (IMPI) and public user identities, IP Multimedia Public Identity (IMPU). Both IMPI and IMPU are Uniform Resource Identifiers (URIs) that can be digits (a Tel URI, like tel:+1-555-123-4567) or alphanumeric identifiers (a SIP URI, like sip:john.doe@example.com). IMS identities are stored in a subscriber database, hereinafter referred to as a Home Subscriber Server (HSS) together with subscriber service profiles, service triggers and other information.

The IMPI is a unique permanently allocated global identity assigned by the home network operator, and is used, for example, for Registration, Authorization, Administration, and Accounting purposes. Every IMS user shall have one or more IMPI.

The IMPU is used by any user for requesting communications with other users. The IMPU can be published (e.g. in phone books, web pages, business cards). There can be multiple IMPU per IMPI. The IMPU can also be shared between several terminals, so that several terminals can be reached with the same identity (for example, a single phone-number for an entire family).

IMPUs may be stored in the HSS as Wildcarded Public User Identities (wIMPUs). The wIMPU represents a collection of IMPUs that share the same service profile and are included in the same Implicit Registration Set (IRS). An IRS is a group of IMPUs that are registered via a single registration request. When one of the IMPUs within the set is registered, all IMPUs associated with the IRS are registered at the same time. wIMPUs include a regular expression (reg exp) that defines the identities that should be matched and handled as defined for the wIMPU.

A Public Service Identity (PSI) identifies a service, or a specific resource created for a service on an Application Server (AS). The PSI is stored in the HSS either as a distinct PSI or as a wildcarded PSI. The distinct PSI contains the PSI that is used in routing, whilst the wildcarded PSI represents a collection of PSIs. The format of the wPSI is the same as for the wIMPU.

The handling of wildcarded identities, i.e. wPSIs and wIMPUs, was specified in the Third Generation Project Partnership (3GPP) Release 7 and 8 respectively, see for instance 3rd Generation Partnership Project (3GPP) TS 23.003. wIMPU has been included in the standards to support Private Branch Exchanges (PBX) where thousands of numbers can be registered from one single identity. Implicit registration is not applicable as downloading thousands of implicit identities registered to the rest of the system is not an option (the message would be too long).

There has therefore been a need for the wIMPU which is associated with a group of IMPUs sharing the same service profile and requiring a single explicit registration to provide services to all the identities behind a PBX. The following conditions are applicable for the wIPMU:

- The subscription under a wIMPU will be handled by the same Serving CSCF (S-CSCF) in the situation of routing towards the core or by the same PBX in the situation of routing in the interface (Gm) between a user terminal, hereinafter called a User Equipment (UE), and the IMS network, so that no further checking is needed.
- No individual authentication of the IMPUs within a wIPMU is performed.
- No individual service profile is provisioned anywhere in the network for the distinct IMPUs within a wIMPU.
- There is no interface (Ut) between UEs and Applications Servers (AS) available for individual IMPUs included within a wIMPU as they will all have only one authentication information.
- There is no individual service setting provisioned anywhere in the network for the distinct IMPUs within a wIMPU. Standards state that an AS can only store service data on the wIMPU, that is, only one set of transparent data for the whole wIMPU.
- All the users within the number range of a wIMPU should belong to the same IRS, therefore they need to belong to the same subscription.
- All the wIMPUs and the distinct IMPUs within the wIMPU from one subscription should be provisioned in the same HSS.

There are thus certain limitations in terms of services and profiles applicable for the distinct IMPUs within the range of a wIMPU. In specific cases it might therefore be desired to assign a different service profile for a distinct IMPU within a wIMPU. As an example, the president of a company, even though having a phone number from the same range as the rest of the company, could be assigned a different service profile. Consequently the different service profile assigned to the president would be provisioned in the HSS as a distinct IMPU. It could also be desired that the president could use his mobile UE to receive calls to/from his company's phone number. However, this may result in undesired forking of terminating calls. The above described desired special treatment of distinct identities within a wildcarded identity is not completely supported in the present standards. There is therefore a need for solutions that provide better support for such situations.

SUMMARY

It is an object of the invention to provide a method and apparatus for handling public identities in an Internet protocol Multimedia Subsystem (IMS) network, which at least partly overcome some of the above mentioned limitations and challenges associated with supporting wildcarded public identities. This object is achieved by means of methods and an apparatuses according to the attached independent claims.

According to different aspects, methods and apparatuses are provided for handling public identities in an IMS network.

According to one aspect, a method in a Call Session Control Function (CSCF) node is provided for handling public identities in an IMS network. The CSCF node receives information indicating a set of distinct public identities. The public identity/identities of the set of distinct public identities is/are within a range of a wildcarded identity but not in the same Implicit Registration Set (IRS) as the wildcarded public identity. The information is received from a Home Subscriber Server (HSS) node. The CSCF node stores, or alternatively forwards to another CSCF node, the information indicating the set of distinct public identities. Storing or forwarding the information indicating the set of distinct public identities allows matching of an originating request to the information indicating the set of distinct public identities.

Furthermore, a CSCF node is provided for handling public identities in an IMS network. The CSCF node is configured to receive, from an HSS node, information indicating a set of distinct public identities. The public identity/identities of the set of distinct public identities is/are within a range of a wildcarded identity but not in the same Implicit Registration Set (IRS) as the wildcarded public identity. The CSCF node is further configured to store, or alternatively forward to another CSCF node, the information indicating the set of distinct public identities. Storing or forwarding the information indicating the set of distinct public identities allows matching of an originating request to the information indicating the set of distinct public identities.

According to another aspect, a method in a HSS node is provided for handling public identities in an IMS network. The HSS node stores, at a provisioning time, information indicating a set of distinct public identities. The public identity/identities of the set of distinct public identities is/are within a range of a wildcarded identity but not in the same Implicit Registration Set (IRS) as the wildcarded public identity. The HSS node sends, when the wildcarded public identity is registered in the IMS network, the information indicating the set of distinct public identities, to a CSCF node. Sending the information indicating the set of distinct public identities allows matching of an originating request to the information indicating the set of distinct public identities.

Furthermore, an HSS node is provided for handling public identities in an IMS network. The HSS node is configured to store, at a provisioning time, information indicating a set of distinct public identities. The public identity/identities of the set of distinct public identities is/are within a range of a wildcarded identity but not in the same Implicit Registration Set (IRS) as the wildcarded public identity. The HSS node is further configured to send, when the wildcarded public identity is registered in the IMS network, the information indicating the set of distinct public identities, to a CSCF node. Sending the information indicating the set of distinct public identities allows matching of an originating request to the information indicating the set of distinct public identities.

Further features and benefits of embodiments of the invention will become apparent from the detailed description below.

BRIEF DESCRIPTION OF THE DRAWINGS

The invention will now be described in more detail by means of exemplary embodiments and with reference to the accompanying drawings, in which:

FIG. 7 is a flow chart schematically illustrating a method for handling public identities in an IMS network, in accordance with an embodiment of the invention;

FIG. 8 is a flow chart schematically illustrating a method for handling public identities in an IMS network, in accordance with an embodiment of the invention;

DETAILED DESCRIPTION

Figure 1:
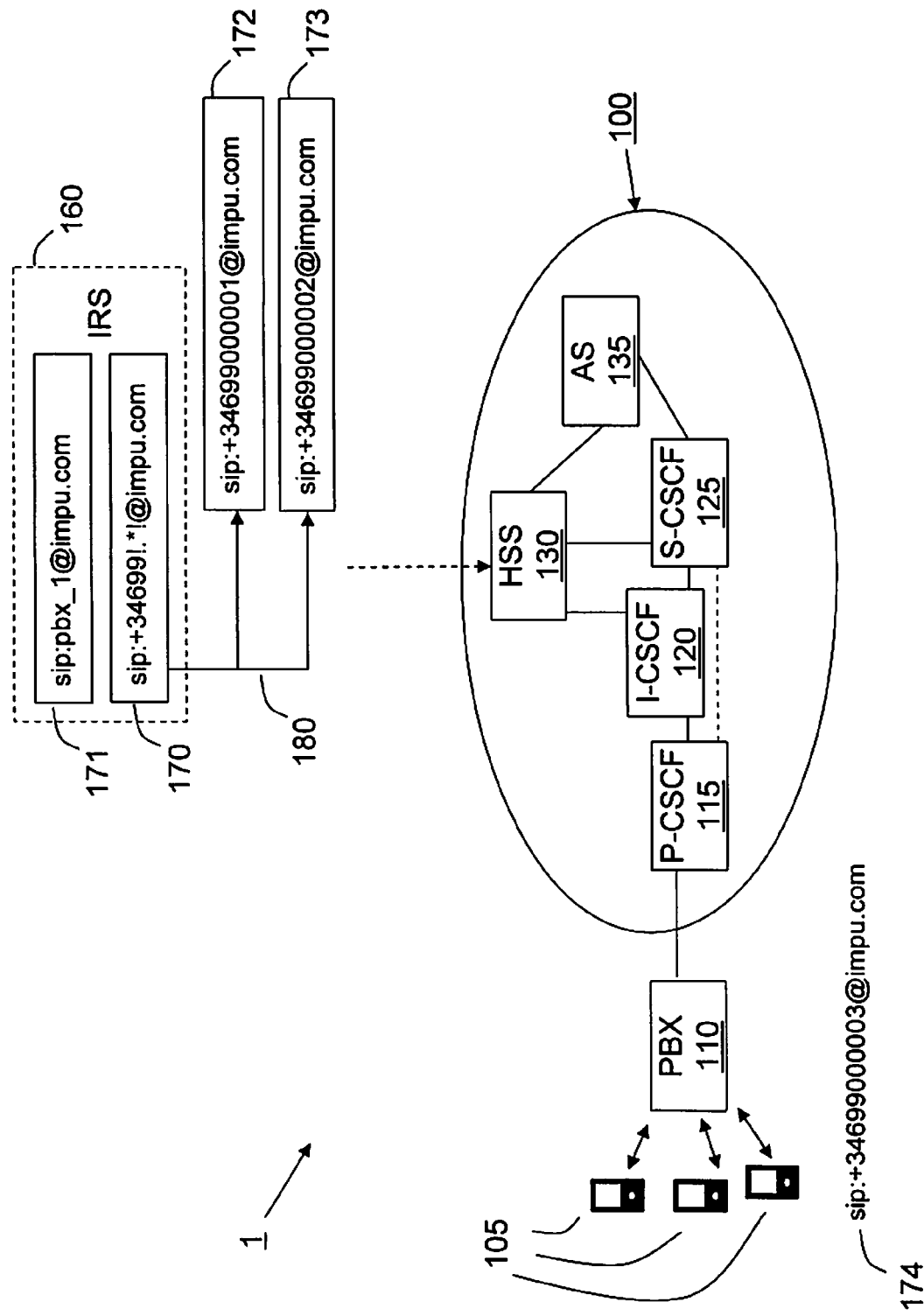
FIG. 1 is a block diagram schematically illustrating a telecommunications system in which embodiments of the invention may be implemented.

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

FIG. 1 illustrates an exemplary telecommunications system 1 in which embodiments of the present invention may be implemented. The telecommunications system 1 includes an Internet protocol Multimedia Subsystem (IMS) network 100 serving a Private Branch Exchange (PBX) 110. The PBX 110 can, in turn, serve thousands of User Equipments (UE), illustrated by the UEs 105 in FIG. 1. In this way, thousands of numbers can be registered from a single identity.

The IMS network 100 comprises various session control nodes, referred to as Call Session Control Function (CSCF) nodes. These CSCF nodes include a Proxy CSCF (P-CSCF) node 115 providing a point of contact for users in the IMS network 100, a Serving CSCF (S-CSCF) node 125 controlling various sessions for users, and an Interrogating CSCF (I-CSCF) node 120 providing an interface towards other IMS networks and which also queries a subscriber database node, hereinafter referred to as a Home Subscriber Server (HSS) node 130, for user related information during user registration and termination. The interface between the HSS 130 and either the I-CSCF 120 or the S-CSCF 125 is specified in the standards as a Cx interface. Hereinafter only the Cx interface is referred to, but those skilled in the art understands that the description applies in a similar manner to a Dx interface and a Subscription Locator Function (SLF) node, not shown, in situations when there are more than a single HSS 130 in the IMS network 100. The HSS 130 stores subscriber and authentication data which can be retrieved by other nodes for serving and handling different users. The HSS 130 may also store one or more Implicit Registration Set (IRS), 160 which will be explained more in detail below. The interface between the CSCFs is specified in the standards as an Mw interface.

The IMS network 100 also comprises a number of Application Server (AS) nodes configured to provide different communication services when invoked to meet service requests for clients. For the sake of simplicity only one AS node 135 is shown in FIG. 1. Each AS 135 may be configured to provide a specific service or a particular set of services. The AS 135 is linked to the session control signaling over an interface to the S-CSCF node 125.

Let us assume that the PBX 110 is associated with a company and that a wildcarded identity 170, sip:+34699!.*!@impu.com, is associated with the identities behind the PBX 110, i.e. with extension numbers (e.g. employees) of the company. A first public identity 171, sip:pbx_1@impu.com, is used to register the wildcarded identity 170. The first public identity 171 is provisioned in the same IRS 160 as the wildcarded identity 170.

Figure 2:
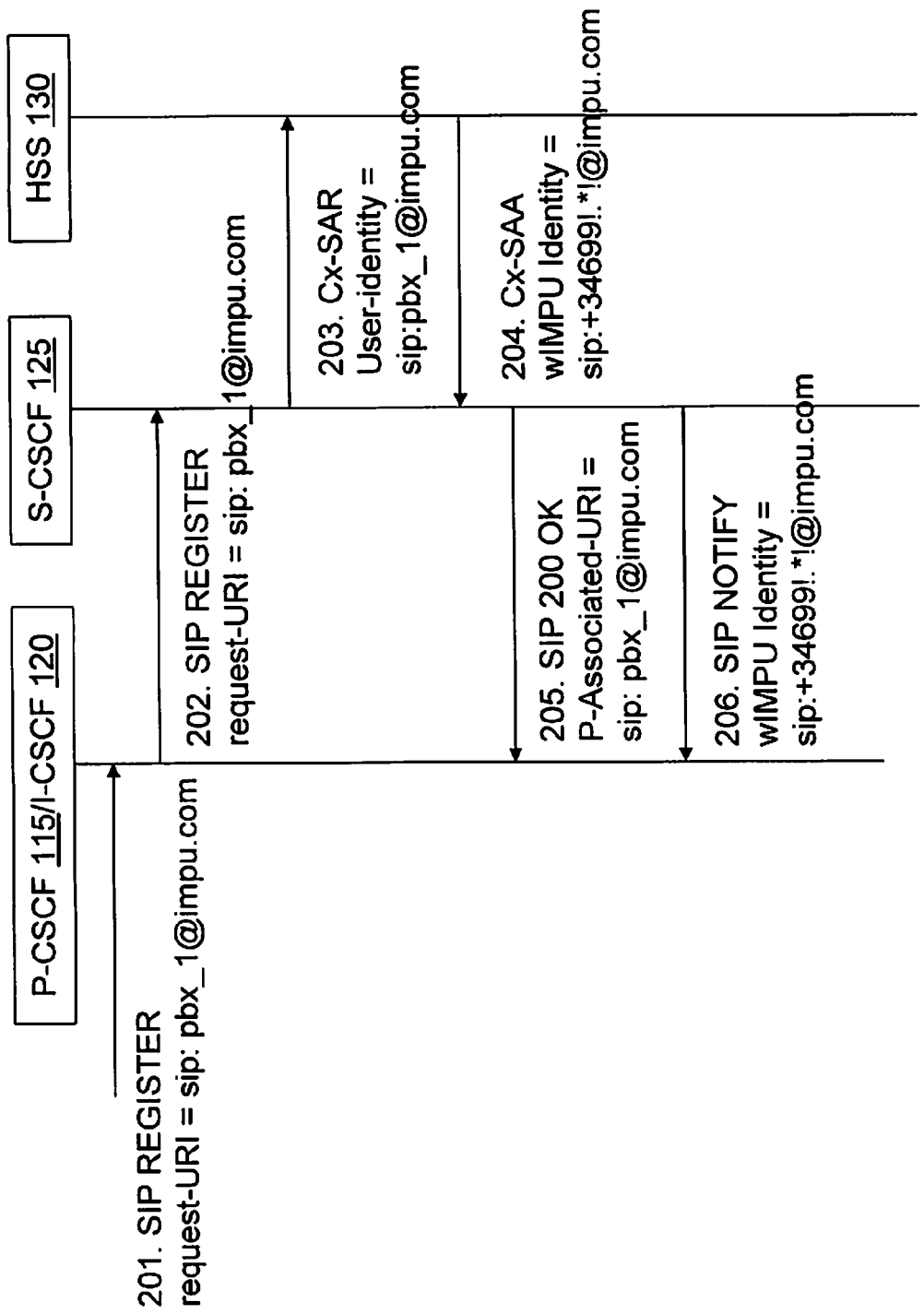
FIG. 2 is a signaling diagram schematically illustrating handling of public identities in an Internet Protocol Multimedia Subsystem (IMS) network, in accordance with the prior art.

FIG. 2 is a signaling diagram schematically illustrating the traffic flow for a registration request related to the wildcarded public identity 170, as defined in standards today.

Signals and steps indicated by reference numerals 201-206 respectively in FIG. 2 are explained below.
- 201: A SIP REGISTER request is received at the P-CSCF 115. The request includes the first public identity 171.
- 202: The P-CSCF 115 forwards the request to the I-CSCF 120, which after querying the HSS 130 forwards the request to the S-CSCF 125. Note that, for the sake of simplicity, the interaction between the I-CSCF 120 and the HSS 130 is not shown in FIG. 2.
- 203: The S-CSCF 125 sends a Cx Server Assignment Request (SAR) to retrieve a service profile associated with the first public identity 171.
- 204: The HSS 130 sends the requested service profile/IRS including the wildcarded identity 170, since the first public identity 171 and the wildcarded identity 170 both belong to the same IRS.
- 205: The S-CSCF 125 stores the IRS information. The S-CSCF 125 sends a SIP 200 OK response to the P-CSCF 115 including all distinct identities in the IRS, i.e. all the provisioned identities, irrespective of if these identities are within the range of the wildcarded identity 170 or not.
- 206: The S-CSCF 125 informs the P-CSCF 115 that there is a wildcarded identity 170 associated to the same registration event by including the wildcarded identity 170 in the SIP NOTIFY for this registration event.

Let us further assume that one of the UEs 105 is associated with a second public identity 172, sip:+34699000001@impu.com, which represents the president of the company. Let us further assume that it is desired, for reasons discussed above, to assign to the president a user/service profile that is different from the user/service profile assigned to the wildcarded public identity 170. That is, it is desired to provide different services or service degree to the president than to the other employees. Accordingly, the second public identity 172 needs to be provisioned in the HSS 130, i.e. the second public identity is a distinct public identity. An existing requirement in the standards is that the matching of distinct identities shall take precedence over the matching of wildcarded identities. That is, if a public identity is provisioned in an HSS as a distinct public identity, and if the public identity falls into the range of a wildcarded public identity that also is provisioned in the HSS, then the HSS will match the public identity with the distinct public identity. Another existing requirement in the standards is that all the distinct identities within the range of a wildcarded identity should be included in the same IRS. However, the latter requirement limits the possibility of registering independently from a different contact, since all the identities within the wildcarded identity must be registered and de-registered at the same time. Further it also limits the amount of "special numbers" that can be included in the range of the wildcarded identity as there is a limit in the number of identities that can be transported in the different fields of the SIP messages, such as the P-Associated URI field in the 200 OK message described in step 205 above.

Therefore the inventors have foreseen a need to remove the limitation of having to include all the public identities within the range of a wildcarded public identity within the same IRS as the wildcarded public identity. However, if all the public identities within the range of a wildcarded public identity are not included in the same IRS, a problem might occur on originating call scenarios. This problem will be further discussed below in connection with FIG. 3.

Let us therefore assume that the second public identity 172 (which represents the president of the company) is included in a different IRS than the wildcarded public identity 170. As discussed above, the reason why the second public identity 172 is included in a different IRS is that it is desired that the president should have a service profile that is different from the service profile associated with the other employees without having to be registered and de-registered at the same time as all the other identities within the wildcarded identity. Note that the IRS associated with the second public identity 172 is not shown in FIG. 1.

Figure 3:
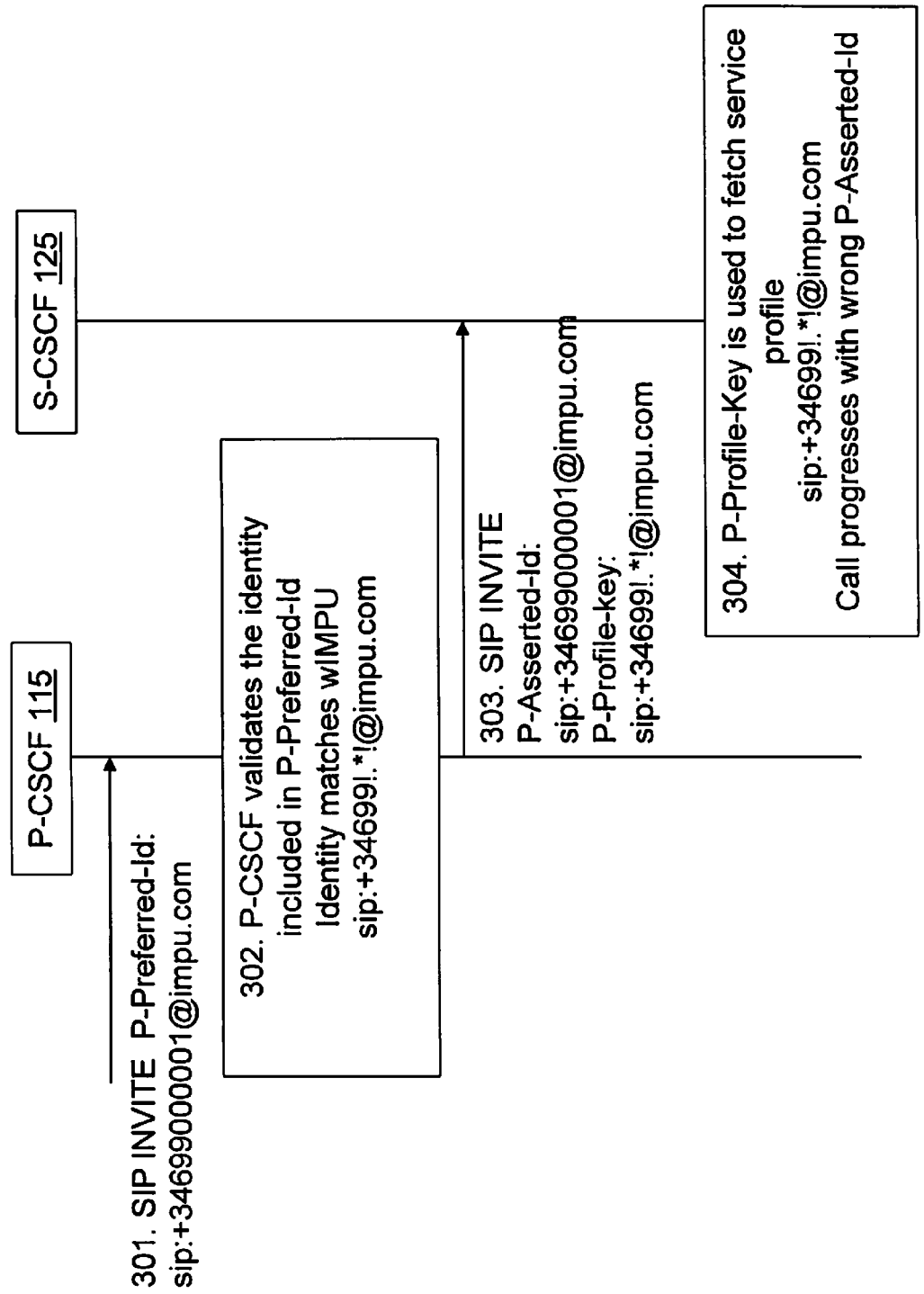
FIG. 3 is a signaling diagram schematically illustrating handling of public identities in an IMS network.

FIG. 3 is a signaling diagram schematically illustrating a traffic flow for an originating request related to the second public identity 172. It is assumed that the wildcarded identity 170 has previously been implicitly registered. It is further assumed that the second public identity 172 has not previously been registered. As discussed above the second public identity 172 falls within the range of the wildcarded public identity 170, but is included in a different IRS than the wildcarded public identity. Thus the second public identity 172 is provisioned in the HSS 130 as a distinct public identity.

Signals and steps indicated by reference numerals 301-304 respectively in FIG. 3 are explained below.
- 301: An originating request (SIP INVITE) is received at the P-CSCF 115. The request includes the second public identity 172.
- 302: The P-CSCF 115 checks if there are any distinct public identity registered that matches the second public identity 172. Note that the matching of distinct public identities takes precedence over the matching of wildcarded identities. Since the second public identity 172 is not registered, a match is not found, so the P-CSCF 115 initiates wildcarded public identities matching. A match is found with the wildcarded public identity 170.
- 303: The P-CSCF 115 forwards the originating request to the S-CSCF 125, including the validated second public identity 172 in the P-Asserted-Identity, and the wildcarded identity 170 in a P-Profile-key.
- 304: The S-CSCF 125 uses the wildcarded identity 170, received in the P-Profile-key, to fetch the associated service profile. The result is that the call progresses with the wrong P-Asserted-Identity. The P-CSCF 115 wrongly validates the second public identity 172, since the P-CSCF 115 does not detect that the second public identity 172 is not registered. The correct P-Asserted-Identity should instead have been the default public identity in the wildcarded public identity IRS.

Consequently, the use of wildcarded public identities might open a possibility for impersonation from within the PBX 110. If the originating request includes the (previously not registered) second public identity 172 representing the president, but is sent from an UE, which does not belong to the president, then the call will be wrongly progressed since the P-CSCF 115 finds a match with the (previously registered) wildcarded public identity 170. The IMS system can not claim that it is the responsibility of the PBX to detect the impersonation, since the information is transported in the P-Asserted-Id header, which is one of the headers that the IMS system is assumed to check. Even if it is not a malicious user impersonating, but the real user for the second public identity 172 (i.e. the president of the company), there is a problem if the UE sends an originating request without sending a register request first. In this case the request should be either rejected by the network or authenticated and then handled according to the specific service profile associated with the second public identity 172.

There are thus a number of problems associated with the current handling of wildcarded identities, in situations when all the public identities within the range of a wildcarded public identity are not included in the same IRS. As mentioned above, one problem is the possibility of impersonation from within the PBX, e.g. that a malicious UE may use the public identity 172 when sending a request. Another problem is that the request from the public user identity 172 may be wrongly progressed since the public user identity 172 is previously not registered. A further problem is that an incorrect service profile may be applied for the public identity 172.

Briefly described, embodiments of the present invention provide a solution for handling public identities in an IMS network, which in particular increases the flexibility of the handling of wildcarded public identities. Embodiments of the invention provide mechanisms for reliable handling of public identities falling within the range of a wildcarded public identity.

According to embodiments of the invention procedures in the Cx and Mw interfaces is enhanced/added in order to provide information, to the P-CSCF or the S-CSCF, about distinct public identities within the range of a wildcarded public identity, which are not in the same IRS as the wildcarded public identity. Thus a wrong matching of originating requests can be prevented and the situation described in connection with step 304 in FIG. 3 can be avoided, i.e. it can be ensured that a correct user/service profile is used or that the call is rejected.

Let us again assume that one of the UEs 105 is associated with the second public identity 172, sip:+34699000001@impu.com, representing the president of the company. Let us further assume that one other of the UEs 105 is associated with a third public identity 173, sip:+34699000002@impu.com. The first public identity 172 and the second public identity 173 are provisioned within the range of the wildcarded public identity 170, but are associated with different, not shown IRSs. A fourth public identity 174 illustrates a public identity that also falls within the range of the wildcarded public identity 170 but which is not provisioned in the HSS 130. As discussed above, the second public identity 172 and the third public identity 173 are distinct public identities. The fourth public identity 174 is not a distinct public identity, since it is not provisioned.

At a provisioning time an operator provisions the first public identity 171 and the wildcarded public identity 170 within the IRS 160. The operator further provisions the second public identity 172 and the third public identity 173. As discussed above the second public identity 172 and the third public identity 173 are not provisioned in the same IRS 160 as the wildcarded public identity 170, but in different, not shown, IRSs.

In addition, according to embodiments of the invention, the HSS 130 checks if the second public identity 172 and the third public identity 173 overlap with a provisioned wildcarded identity. In this example, the wildcarded identity 170 is found, so the HSS 130 marks/links or associates internally the wildcarded identity 170 with the second public identity 172 and the third public identity 173. The association is represented by information 180 in FIG. 1. The information 180 indicates a set of distinct public identities 172, 173 within a range of a wildcarded public identity 170, which are not in the same IRS 160 as the wildcarded public identity 170. In other words, at provisioning time, the HSS 130 stores the information 180 indicating the set of distinct public identities, which are not in the same IRS as the wildcarded public identity.

Figure 4:
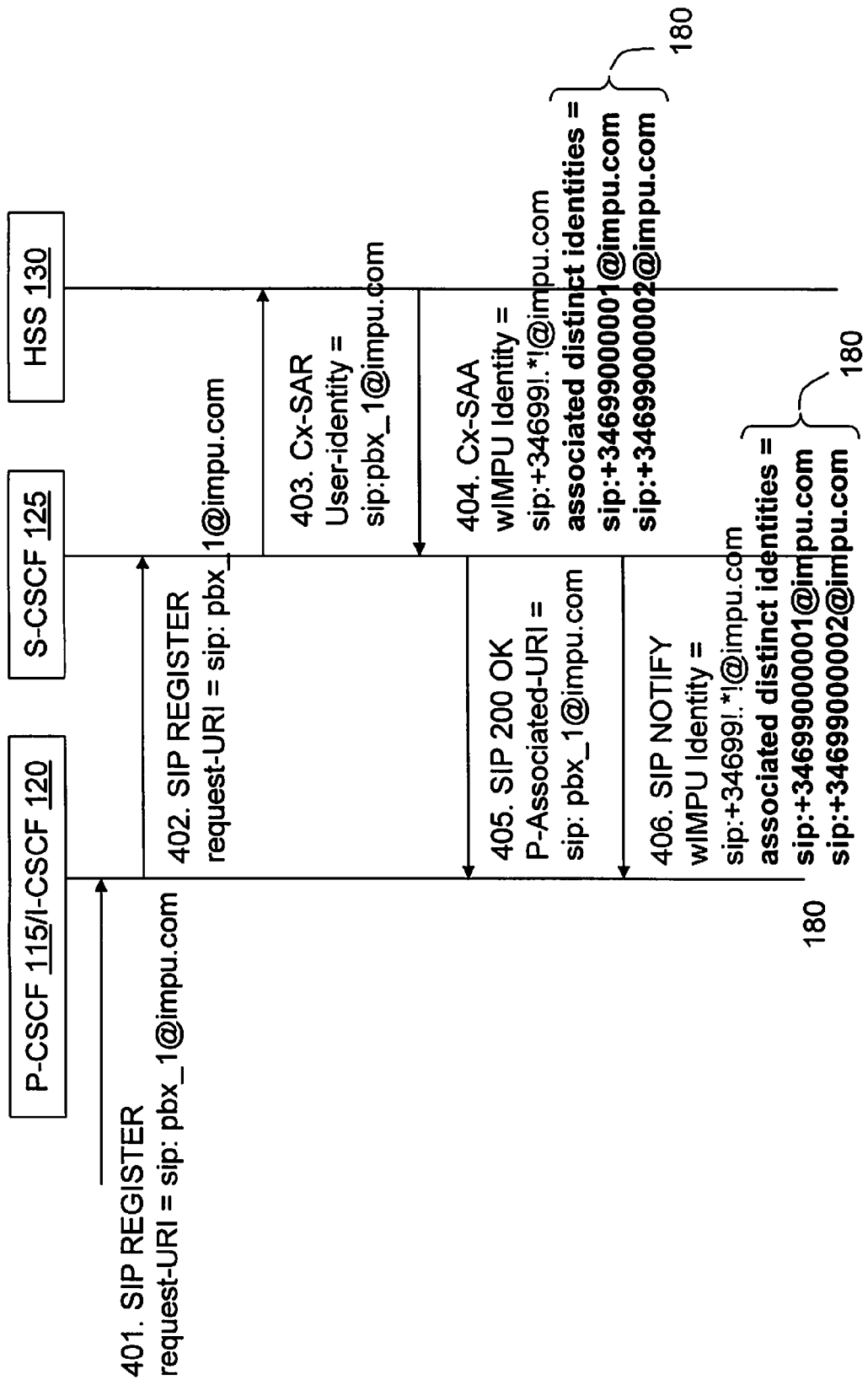
FIG. 4 is a signaling diagram schematically illustrating handling of public identities in an IMS network, in accordance with certain embodiments of the invention.

FIG. 4 is a signaling diagram schematically illustrating the traffic flow for a registration request related to the wildcarded public identity 170, in accordance with an exemplary embodiment of the invention.

Signals and steps indicated by reference numerals 401-406 respectively in FIG. 4 are explained below.

The steps 401-403 corresponds to the steps 201-203 described in connection with FIG. 2 above. Steps 401-403 will therefore not be explained in further detail.

404: As in step 204 of FIG. 2, the HSS 130 sends the service profile/IRS including the wildcarded identity 170. However, the HSS 130 also sends the information 180 indicating the set of distinct public identities, which are not in the same IRS as the wildcarded identity 170. As discussed above the HSS 130 has previously (at the provisioning time) stored the information 180 indicating the set of distinct public identities, which are not in the same IRS. In this example the information 180 is received from the HSS node 130 in an Attribute Value Pair (AVP) included in a Cx Server Assignment Answer (SAA) message.

405: As in step 205 of FIG. 2, the S-CSCF 125 stores the IRS information. In addition, the S-CSCF 125 also stores the information 180 indicating the set of distinct public identities, which are not in the same IRS. Alternatively, the information is not stored in the S-CSCF 125, but forwarded to the P-CSCF 115. This alternative will be further explained in step 406. Finally, as in step 205 of FIG. 2, the S-CSCF 125 sends a SIP 200 OK to the P-CSCF 115 including all distinct identities in the IRS.

406: As in step 206 of FIG. 2, the S-CSCF 125 informs the P-CSCF 115 that there is a wildcarded identity 170 associated to the same registration event by including the wildcarded identity 170 in the SIP NOTIFY for this registration event. In addition, as mentioned above, the S-CSCF 125 may also inform the P-CSCF 115, by forwarding the information 180 indicating the set of distinct public identities, which are not in the same IRS. The P-CSCF 115 stores the received information 180 if received from the S-CSCF 125.

Consequently, according to one embodiment, when the wildcarded public identity 170 is registered, the information 180 indicating the set of distinct public identities is sent from the HSS 130 to the S-CSCF 125 and stored at the S-CSCF 125. According to another embodiment the information 180 indicating the set of distinct public identities is sent from the HSS 130 to the S-CSCF 125, forwarded to the P-CSCF 115 and stored at the P-CSCF 115 (i.e. the P-CSCF receives the information 180 from the HSS 130 via the S-CSCF 125). The information 180 is stored for allowing matching, either in the S-CSCF 125 or in the P-CSCF 115, of an originating request to the information 180. The matching of the originating request will now be discussed in more detail.

Figure 5:
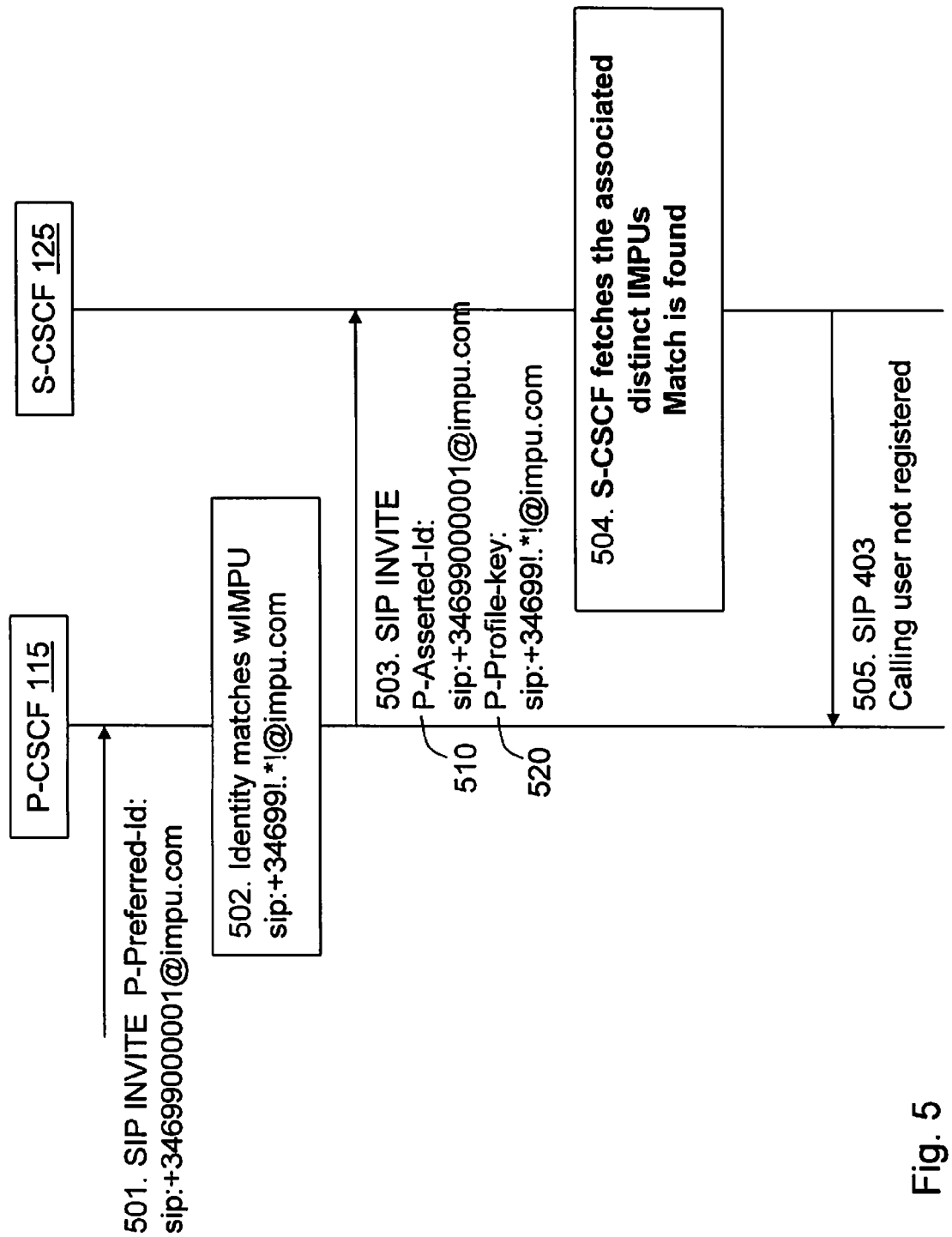
FIG. 5 is a signaling diagram schematically illustrating handling of public identities in an IMS network, in accordance with an embodiment of the invention.

FIG. 5 is a signaling diagram schematically illustrating the traffic flow for an originating request related to the wildcarded public identity 170, according to the embodiment discussed above, wherein the matching is performed in the S-CSCF 125. It is assumed that the wildcarded identity 170 has previously been implicitly registered. It is further assumed that the second public identity 172 has not previously been registered. As discussed above the second public identity 172 is included in a different IRS than the wildcarded identity 170.

Signals and steps indicated by reference numerals 501-505 respectively in FIG. 5 are explained below.

501: Similar to step 301 of FIG. 3, an originating request, in this example an SIP INVITE request, including the second public identity 172, is received at the P-CSCF 115.

502: Similar to step 302 of FIG. 3 the P-CSCF 115 matches the second public identity 172 with the wildcarded public identity 170.

503: Similar to step 303 of FIG. 3, the P-CSCF 115 sends the originating request to the S-CSCF 125, including the second public identity 172 and the wildcarded public identity 170. In this example the P-CSCF 115 includes the validated second public identity 172 in the P-Asserted-Identity 510, and the wildcarded identity 170 in the P-Profile-key 520.

504: The S-CSCF 125 checks if there is any non registered distinct public identities associated with the wildcarded public identity. In other words, the S-CSCF 125 checks if the public identity 172 included in the originating request matches with the information 180 indicating the set of distinct public identities, which are not in the same IRS as the wildcarded identity 170. If a match is not found the S-CSCF 125 fetches the service profile, using the wildcarded public identity 170. If a match is found the S-CSCF 125 will not fetch the service profile, and instead reject the call according to step 505.

505: If a match is found with the information 180, as discussed in step 504, the S-CSCF 125 informs the P-CSCF 115 that the second public identity 172 is not registered, in this example by sending a SIP 403 message.

Consequently, a request sent from the not registered distinct public identity 172, which falls within the range of the wildcarded public identity 170, but which is not in the same IRS as the wildcarded public identity, will be rejected. Impersonation from within the PBX is thus prevented. It is also assured that a request from a previously not registered public user identity is not progressed. However, a request sent from the public identity 174, which also falls within the range of the wildcarded public identity 170, will be progressed and handled according to the service profile associated with the wildcarded public identity. The public identity 174 is implicitly registered since the wildcarded identity 170 is registered. The public identity 174 is not provisioned as a distinct public identity, and can thus not be matched with the information 180.

Figure 6:
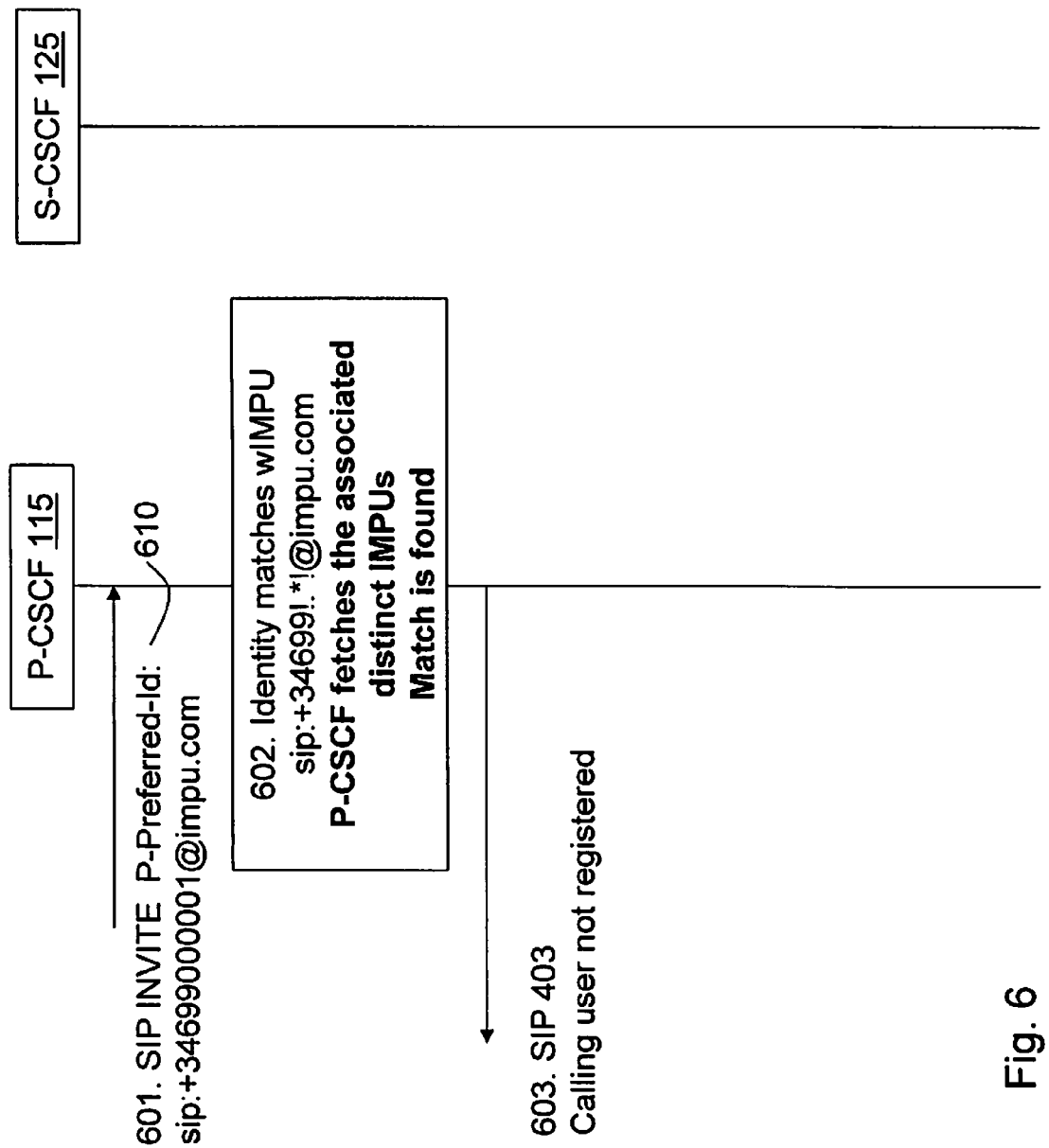
FIG. 6 is a signaling diagram schematically illustrating handling of public identities in an IMS network, in accordance with an embodiment of the invention.

FIG. 6 is a signaling diagram schematically illustrating the traffic flow for an originating request related to the second public identity 172, according to the embodiment wherein the matching is performed in the P-CSCF 115. As before, it is assumed that the wildcarded identity 170 has previously been implicitly registered, and that the second public identity 172 has not previously been registered. As discussed above the second public identity 172 is included in a different IRS, and provisioned in the HSS 130 as a distinct public identity.

Signals and steps indicated by reference numerals 601-603 respectively in FIG. 6 are explained below.

601: Similar to step 501 of FIG. 5, an originating request, in this example an SIP INVITE request, including the second public identity 172, is received at the P-CSCF 115.

602: Similar to step 502 of FIG. 5 the P-CSCF 115 checks if there is any distinct public identity registered that matches the second public identity 172. Since a match is not found the P-CSCF 115 initiates wildcarded public identities matching. A match is found with the wildcarded public identity 170. In addition, the P-CSCF 155 checks if there is any non registered distinct public identities associated with the wildcarded public identity. In other words, the P-CSCF 115 checks if the public identity 172 included in the originating request matches with the information 180 indicating the set of distinct public identities, which are not in the same IRS as the wildcarded public identity 170. If a match is not found the P-CSCF 115 sends, similar to step 503 of FIG. 5, the originating request to the S-CSCF 125, including the second public identity 172 and the wildcarded public identity 170. If a match is found the P-CSCF 115 will instead reject the request according to step 603.

603: If a match with the information 180 is found, as discussed in step 602, the P-CSCF 115 rejects the request since the public identity 172 is not registered. In this example the P-CSCF 115 rejects the request by sending a SIP 403 message.

Consequently, a request sent from the non registered distinct public identity 172, which falls within the range of the wildcarded public identity 170, but which is not in the same IRS, will be rejected already at the P-CSCF 115, and will never be forwarded to the S-CSCF 125. This saves signaling in the Mw-interface and processing in the S-CSCF 125.

It is to be noted that if the public identity 172 subsequently registers, it may be removed from the information 180. In the embodiment where the matching is performed by the S-CSCF 125 this may be done in connection with a not shown step corresponding to step 405 of FIG. 4, after the S-CSCF 125 has stored the information 180. The S-CSCF 125 checks if the public identity 172 received in a subsequent registration request matches with the information 180. If a match is found the public identity 172 is removed from the information 180. In the embodiment where the matching is performed by the P-CSCF 115, it is instead the P-CSCF 115 that checks if the public identity 172 received in a subsequent register request matches with the information 180, and removes the public identity 172 is from the information 180, if a match is found. The matching of a subsequent registration request enables a subsequent originating request to be correctly handled since when the P-CSCF 115 receives the originating request, including the public identity 172, it will be matched as a registered distinct public identity. The originating request will be forwarded to the S-CSCF 125 including the public identity 172, but without the wildcarded public identity 170, since the public identity 172 was matched as distinct. The public identity 172 will then be used to fetch the service profile. Note that the removal of the public identity 172 from the information 180 is optional. If the public identity 172 is not removed, it will not cause any problem, since if the public identity 172 is registered, the CSCF will not perform the wildcarded public identities matching, hence the information 180 will not be fetched. However, the removal of registered public identities from the information 180 saves internal CSCF resources.

According to certain embodiments of the invention the public identities 172, 173, 174, are public user identities, IMPUs, and the wildcarded public identity 170, is a wildcarded public user identity, wIMPU.

From the description above of FIG. 5 and FIG. 6 it has been shown that a method of handling public identities in order to support distinct public identities within a range of a wildcarded identity can be carried out in different CSCF nodes, e.g. in the P-CSCF 115 or in the S-CSCF 125.

A flow chart schematically illustrating a method in the CSCF node 115, 125, for handling public identities in an IMS network, in accordance with embodiments of the invention, will now be described with reference to FIG. 7.

Steps indicated by reference numerals 701-703 respectively in FIG. 7 are explained below.

In a step 701, the CSCF node 115, 125 receives information indicating a set of distinct public identities, within a range of a wildcarded public identity, which set of distinct public identities are not in the same IRS as the wildcarded public identity. The information is received from an HSS node. Step 702 illustrates that the CSCF node 115, 125 stores the information indicating the set of distinct public identities, in the CSCF node 115, 125, for allowing matching of an originating request to the information indicating the set of distinct public identities. In an alternative step 703, the CSCF node 125 forwards the information 180 indicating the set of distinct public identities to another CSCF node 115, for allowing matching of an originating request to the information 180 indicating the set of distinct public identities.

A flow chart schematically illustrating a method in the HSS node 130, for handling public identities in an IMS network, in accordance with embodiments of the invention, will now be described with reference to FIG. 8.

Steps indicated by reference numerals 801-802 respectively in FIG. 8 are explained below.

In a step 801, the HSS node 130 stores, at a provisioning time, information indicating a set of distinct public identities, within a range of a wildcarded public identity, which set of distinct public identities are not in the same IRS as the wildcarded public identity. Step 802 illustrates that the HSS node 130 sends, when the wildcarded public identity is registered in the IMS network, the information indicating the set of distinct public identities to the CSCF node 115, 125, for allowing matching of an originating request to the information indicating the set of distinct public identities.

Figure 9:
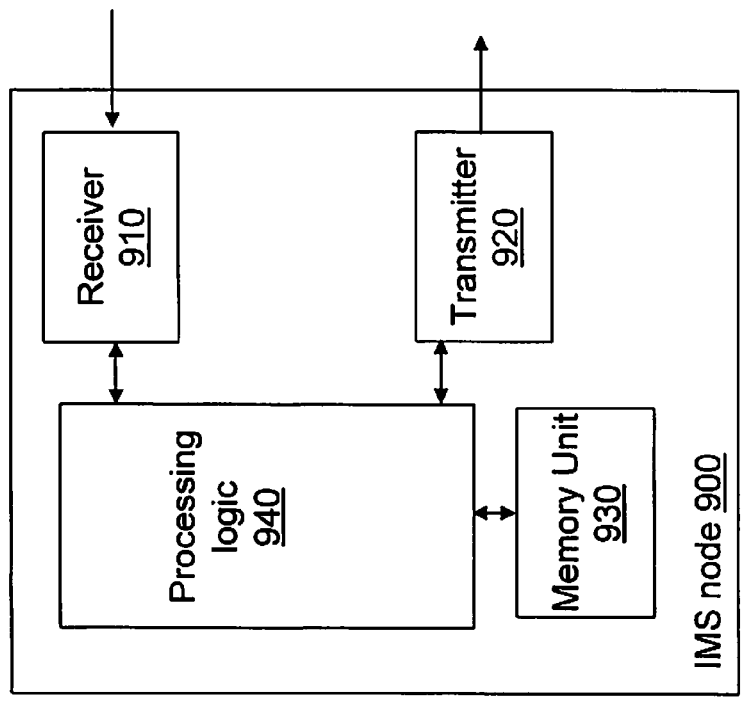
FIG. 9 is a block diagram schematically illustrating an IMS node, which may be a CSCF or an HSS node, in accordance with certain embodiments of the invention.

FIG. 9 is a schematic block diagram of an IMS node 900 which may be an exemplary embodiment of the CSCF node 115, 125 or the HSS node 130 adapted to execute the methods described in connection with FIG. 7 and FIG. 8 respectively. As illustrated, the IMS node 900 comprises a receiver 910, a transmitter 920, processing logic 940, and a memory unit 930.

The receiver 910 and the transmitter 920 may comprise circuitry that allows the IMS node 900 to communicate with other nodes. In particular in case where the IMS node 900 is an embodiment of the CSCF node 115, 125, the receiver 910 is configured to receive the information indicating the set of distinct public identities, according to step 701, discussed above.

The processing logic 940 may control the operation of the IMS node 900. In particular, the processing logic 940 may be configured to store the information indicating the set of distinct public identities in the memory unit 930, according to step 702 and 801 discussed above.

Alternatively, in a case where the IMS node is an embodiment of the S-CSCF node 125, the processing logic 940 may be configured to forward the information indicating the set of distinct public identities by the transmitter 920, according to step 703, discussed above.

In a case where the IMS node 900 is an embodiment of the HSS, the transmitter 920 is further configured to send the information indicating the set of distinct public identities to the CSCF node 115, 125, according to step 802, discussed above.

The processing logic 940 can be a single unit or a plurality of units to perform different steps of procedures described herein. The receiver 910 and the transmitter 920 may be arranged as one in a combined transceiver in the hardware of the IMS node 900.

Furthermore the IMS node 900 may comprise at least one, not shown, computer program product in the form of a non-volatile memory, e.g. an EEPROM, a flash memory and a disk drive. The computer program product may comprise a computer program, which comprises code means which when run on the IMS node 900 causes the IMS node 900 to perform the steps of the procedures described earlier in conjunction with FIG. 7 and FIG. 8. In alternative embodiments, at least one of the code means may be implemented at least partly as hardware circuits.

As described above, embodiments of the invention provide improved support for handling distinct public identities within the range of a wildcarded public identity. Embodiments of the invention ensures that a correct service profile is applied, i.e. the service profile associated with the distinct public identity, and not the service profile associated with the wildcarded public identity. Furthermore, embodiments of the invention makes it possible to avoid impersonation or to detect erroneous requests since it is possible to detect if a request is related to a not registered public identity. In other words embodiments described herein allow the network to perform originating calling number validation correctly.

An advantage with certain embodiments of the invention is that impersonation can be avoided by rejecting requests including not registered distinct public identities within the range of a wildcarded public identity that are associated with a different IRS than the wildcarded public identity.

A further advantage with certain embodiments of the invention is that it ensures application of desired service profiles in scenarios where a distinct public identity within the range of a wildcarded public identity is associated with a different IRS than the wildcarded public identity, provided that the public identity and wildcarded public identity are under the same subscription. This increases the flexibility of the functionality of wildcarded public identities.

An advantage with certain embodiments of the invention is that, since the matching with the information 180 is performed in the P-CSCF 115, it avoids the P-CSCF 115 including the P-Profile-key towards the S-CSCF 125. Instead the request is rejected by the P-CSCF 115 which saves both signaling and processing.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A method in a Call Session Control Function, CSCF, node for handling public identities in an Internet Protocol Multimedia Subsystem, IMS, network, the method comprising:

receiving, from a Home Subscriber Server, HSS, node, information indicating a set of distinct public identities within a range of a wildcarded public identity, which set of distinct public identities are not in the same Implicit Registration Set, IRS as the wildcarded public identity;

storing the information indicating the set of distinct public identities in the CSCF node or forwarding the information indicating the set of distinct public identities to another CSCF node, for allowing matching of an originating request to the information indicating the set of distinct public identities;

receiving, from a Proxy CSCF, P-CSCF, node, an originating request including a public identity, within the range of the wildcarded public identity, and the wildcarded public identity;

if the public identity included in the originating request matches with a distinct public identity indicated by the information indicating the set of distinct public identities, informing the P-CSCF node that the public identity is not registered; and if the public identity included in the originating request does not match with the information indicating the set of distinct public identities, fetching a service profile associated with the public identity, using the wildcarded public identity included in the originating request.

2. The method according to claim 1, wherein the CSCF node is a Serving CSCF, S-CSCF, node, and the information indicating the set of distinct public identities is stored in the S-CSCF node.

3. The method according to claim 1, wherein the public identity is included in a P-Asserted-Id in the originating request, and the wildcarded public identity is included in a P-Profile-Key in the originating request.

4. The method according to claim 1, wherein the S-CSCF node informs the P-CSCF node that the public identity is not registered by sending a Session Initiation Protocol, SIP, message, if the public identity included in the originating request matches with the information indicating the set of distinct public identities.

5. The method according to claim 1, wherein the CSCF node is a Serving CSCF, S-CSCF, node, and the information indicating the set of distinct public identities is forwarded to a Proxy CSCF, P-CSCF, node.

6. The method according to claim 1, wherein the information indicating the set of distinct public identities is received from the HSS node in an Attribute Value Pair, AVP, included in a Server Assignment Answer, SAA, message.

7. The method according to claim 1, wherein the CSCF node is a Proxy CSCF, P-CSCF, node, and the information indicating the set of distinct public identities is received from the HSS node, via a Serving CSCF, S-CSCF, node, and is stored in the P-CSCF node.

8. The method according to claim 7, further comprising:

if a public identity within the range of the wildcarded public identity is included in the originating request and matches the wildcarded public identity, and if the public identity included in the originating request matches with a distinct public identity indicated by the information indicating the set of distinct public identities, rejecting the request; and if the public identity included in the originating request does not match with the information indicating the set of distinct public identities, sending, to the S-CSCF node, the originating request including the public identity and the wildcarded public identity.

9. The method according to claim 8, wherein the public identity is included in a P-Preferred-Id in the received originating request.

10. The method according to claim 1, wherein the public identity is a public user identity, IMPU, and the wildcarded public identity is a wildcarded public user identity, wIMPU.

11. A Call Session Control Function, CSCF, node for handling public identities in an Internet Protocol Multimedia Subsystem, IMS, network, the CSCF node comprising:

a receiver configured to receive, from a Home Subscriber Server, HSS, node, information indicating a set of distinct public identities within a range of a wildcarded public identity, which set of distinct public identities are not in the same Implicit Registration Set, IRS as the wildcarded public identity;

a memory unit configured to store the information indicating the set of distinct public identities, which are not in the same IRS, in the CSCF node;

a transmitter configured to forward the information indicating the set of distinct public identities to another CSCF node, for allowing matching of an originating request to the information indicating the set of distinct public identities; and processing logic connected to the receiver, to the transmitter and to the memory unit and configured control the memory and the transmitter to store the information or to forward the information; wherein the CSCF node is configured as a Serving CSCF, S-CSCF, node, and the processing logic is configured to store the information indicating the set of distinct public identities in the memory unit;

the receiver is configured to receive an originating request including a public identity within the range of the wildcarded public identity, and the wildcarded public identity;

the processing logic is configured to inform the P-CSCF node that the public identity is not registered if the public identity included in the originating request matches with a distinct public identity indicated by the information indicating the set of distinct public identities; and the processing logic is further configured to fetch a service profile associated with the public identity, using the wildcarded public identity included in the originating request, if the public identity included in the originating request does not match with the information indicating the set of distinct public identities.

12. A Call Session Control Function, CSCF, node for handling public identities in an Internet Protocol Multimedia Subsystem, IMS, network, the CSCF node comprising:

a receiver configured to receive, from a Home Subscriber Server, HSS, node, information indicating a set of distinct public identities within a range of a wildcarded public identity, which set of distinct public identities are not in the same Implicit Registration Set, IRS as the wildcarded public identity;

a memory unit configured to store the information indicating the set of distinct public identities, which are not in the same IRS, in the CSCF node;

a transmitter configured to forward the information indicating the set of distinct public identities to another CSCF node, for allowing matching of an originating request to the information indicating the set of distinct public identities; and processing logic connected to the receiver, to the transmitter and to the memory unit and configured control the memory and the transmitter to store the information or to forward the information, wherein the CSCF node is configured as a Proxy CSCF, P-CSCF, node, and the receiver is configured to receive the information indicating the set of distinct public identities, from the HSS node, via a Serving CSCF, S-CSCF, node, and the processing logic is configured to store the information indicating the set of distinct public identities in the memory unit, the receiver is further configured to receive an originating request including a public identity within the range of the wildcarded public identity; and wherein the processing logic is further configured to reject the request if the public identity included in the originating request is matched with the wildcarded public identity and if the public identity included in the originating request matches with a distinct public identity indicated by the information indicating the set of distinct public identities; and the processing logic is further configured to send, to the S-CSCF node, the originating request including the public identity and the wildcarded public identity if the public identity included in the originating request does not match with the information indicating the set of distinct public identities.

13. A method in a Call Session Control Function, CSCF, node for handling public identities in an Internet Protocol Multimedia Subsystem, IMS, network, the method comprising:

receiving, from a Home Subscriber Server, HSS, node, information indicating a set of distinct public identities within a range of a wildcarded public identity, which set of distinct public identities are not in the same Implicit Registration Set, IRS as the wildcarded public identity;

storing the information indicating the set of distinct public identities in the CSCF node or forwarding the information indicating the set of distinct public identities to another CSCF node, for allowing matching of an originating request to the information indicating the set of distinct public identities;

wherein the CSCF node is a Proxy CSCF, P-CSCF, node, and the information indicating the set of distinct public identities is received from the HSS node, via a Serving CSCF, S-CSCF, node, and is stored in the P-CSCF node, and the method further comprises:

receiving an originating request including a public identity within the range of the wildcarded public identity;

if the public identity included in the originating request is matched with the wildcarded public identity and if the public identity included in the originating request matches with a distinct public identity indicated by the information indicating the set of distinct public identities, rejecting the request; and if the public identity included in the originating request does not match with the information indicating the set of distinct public identities, sending, to the S-CSCF node, the originating request including the public identity and the wildcarded public identity.

14. The method according to claim 13, wherein the public identity is included in a P-Preferred-Id in the received originating request.

* * * * *